(12) United States Patent
Guo et al.

(10) Patent No.: US 9,206,356 B2
(45) Date of Patent: Dec. 8, 2015

(54) NANOPARTICLE, PROCESS, LIQUID CRYSTAL DISPLAY PANEL AND DISPLAY DEVICE FOR INDUCING LIQUID CRYSTAL ALIGNMENT

(71) Applicant: BEIJING BOE OPTOELECTRONICS TECHNOLOGY CO., LTD., Beijing (CN)

(72) Inventors: Renwei Guo, Beijing (CN); Dong Chen, Beijing (CN); Jianyun Xie, Beijing (CN)

(73) Assignee: BEIJING BOE OPTOELECTRONICS TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 14/117,292
(22) PCT Filed: Dec. 21, 2012
(86) PCT No.: PCT/CN2012/087114
§ 371 (c)(1),
(2) Date: Nov. 12, 2013
(87) PCT Pub. No.: WO2014/008747
PCT Pub. Date: Jan. 16, 2014

(65) Prior Publication Data
US 2014/0319420 A1 Oct. 30, 2014

(30) Foreign Application Priority Data
Jul. 12, 2012 (CN) .......................... 2012 1 0242427

(51) Int. Cl.
*C09K 19/00* (2006.01)
*C09K 19/56* (2006.01)
(Continued)

(52) U.S. Cl.
CPC ............... *C09K 19/56* (2013.01); *C09K 19/406* (2013.01); *C09K 2019/523* (2013.01); *Y10T 428/10* (2015.01); *Y10T 428/1005* (2015.01); *Y10T 428/2982* (2015.01)

(58) Field of Classification Search
CPC .... C09K 19/56; C09C 1/3063; C09C 1/3081; B82Y 30/00; B82Y 40/00; C01P 2004/64; G02F 1/133719; G02F 1/133734; Y10T 428/10; Y10T 428/1005; Y10T 428/1009; Y10T 428/1014; Y10T 428/2982

USPC .................. 428/1.1, 1.2, 1.21, 1.23, 402; 252/299.4; 556/461; 359/123, 131
See application file for complete search history.

(56) References Cited

U.S. PATENT DOCUMENTS

2005/0079551 A1   4/2005 Mizuno et al.
2010/0233060 A1*  9/2010 Kuhner et al. ................ 423/335

FOREIGN PATENT DOCUMENTS

CN   101718927 A   6/2010
JP   201251862 A   3/2012

OTHER PUBLICATIONS

International Preliminary Report on Patentability for International Application No. PCT/CN2012/087114 dated Jan. 13, 2015, nine (9) pages.

(Continued)

*Primary Examiner* — Ruiyun Zhang

(57) ABSTRACT

The invention provides a nanoparticle, a process, a liquid crystal display panel and a display device for inducing liquid crystal alignment in an advanced super dimension switch mode. The nanoparticle is a silicon dioxide nanoparticle modified using the organic silicon compound of Formula (I), wherein R can be the same or different and is —H or —$C_2H_5$; M contains rigid groups such as benzene ring, biphenyl, and/or cyclohexane. In the invention, the organic silicon compounds, which share similar structures with the nematic liquid crystal molecules in the ADS mode, are employed for modifying the silicon dioxide nanoparticles, facilitating the even dispersion of the modified silicon dioxide nanoparticles in liquid crystals; and the organic silicon compound contains rigid groups that can effectively induce the directional alignment of the liquid crystals, thereby helping improve the display effect of the ADS mode liquid crystal display panel. Moreover, it can help reducing the driving voltage of the liquid crystal display so as to decrease the energy consumption.

(I)

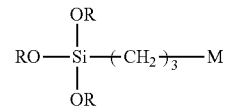

4 Claims, 3 Drawing Sheets

(51) Int. Cl.
*C09K 19/40* (2006.01)
*C09K 19/52* (2006.01)

(56) References Cited

OTHER PUBLICATIONS

English abstract of CN101718927A, listed above in Foreign Patent Documents, 1 page.

English translation of Japanese Publication JP201251862A, 8 pages.

First Office Action (Chinese language) issued by the State Intellectual Property Office ("SIPO") on May 13, 2015 for Application No. 201210242427.3, 6 pages.

English translation of First Office Action issued by SIPO on May 13, 2015 for Application No. 201210242427.3, 4 pages.

* cited by examiner

NANOPARTICLE, PROCESS, LIQUID CRYSTAL DISPLAY PANEL AND DISPLAY DEVICE FOR INDUCING LIQUID CRYSTAL ALIGNMENT

CROSS REFERENCE TO RELATED APPLICATIONS

This application is based on International Application No. PCT/CN2012/087114 filed on Dec. 21, 2012, which claims priority to Chinese National Application No. 201210242427.3, filed on Jul. 12, 2012, the contents of which are incorporated herein by reference.

TECHNICAL FIELD

Embodiments of the present invention relate to a nanoparticle, a process, a liquid crystal display panel and a display device for inducing liquid crystal alignment in an advanced super dimension switch mode.

BACKGROUND

In the art of liquid display, the liquid crystals can be induced to arrange in a regular alignment by treating the surface of the substrate. Based on the difference in the alignment of the liquid crystal molecules in the liquid crystal display panel, it can be classified as horizontal alignment and vertical alignment. When a horizontal alignment layer is coated on the substrate, the long axes of liquid crystal molecules will arrange parallel to the substrate after rubbing, thereby forming the horizontal alignment of the liquid crystal molecules. When a vertical alignment layer is coated on the substrate surface, the long axes of liquid crystal molecules will arrange perpendicular to the substrate after heat treatment, thereby forming the vertical alignment of the liquid crystal molecules. Based on the different ways of liquid crystal alignment, there are many display modes in the art of liquid display. For example modes such as twisted nematic (TN) and advanced super dimension switch (ADS) mostly employ the horizontal alignment technique, and the multi-domain vertical alignment mostly employs the vertical alignment technique. By changing the way of liquid crystal alignment method in the liquid crystal display panel, many new liquid crystal display modes can be developed. It is a new challenge to the liquid crystal industry how to manually control the alignment of liquid crystal molecules.

In ADS mode, a multidimensional electric field is formed from the electric field generated by the edges of the slit electrodes within a plan and the electric field generated between the slit electrode layer and the plate electrode layer, which enable all aligned liquid crystal molecules between the slit electrodes and above the electrodes within the liquid crystal box to rotate, thereby improving the working efficiency of the liquid crystal and increasing the efficiency of transmission. The ADS mode technique can improve the graphic quality of thin film transistor-liquid crystal display (TFT-LCD) products which have the advantages of high resolution, high transmissivity, low energy consumption, wide visual angle, high aperture ratio, low color variation, no push Mura, and the like, and have very high value of application in the art of liquid crystal display, in which the induction of regular alignment of liquid crystals have important impact on the display effect of the liquid crystal display panel. In the art, there are studies using silicon dioxide nanoparticles for inducing the liquid crystal alignment. In this process, primarily the surface tension of the silicon dioxide nanoparticles is utilized to induce the directional alignment of the liquid crystals which has weak inductive effect on the liquid crystal molecules. Moreover, because the silicon dioxide nanoparticles are prone to agglomeration and are inorganic, they have poor dispersion in the liquid crystal, thereby preventing the silicon dioxide nanoparticles from effectively inducing the directional alignment of the liquid crystals, and thus the object of improving the liquid crystal display effect cannot be achieved.

SUMMARY

In view of this, the main purpose of the invention is to provide a nanoparticle, a process, a liquid crystal display panel and display device for inducing liquid crystal alignment in ADS mode.

In order to achieve the aforementioned objects, the technical solutions of the invention are as follows.

The invention provides a nanoparticle for inducing liquid crystal alignment in ADS mode, wherein the nanoparticle is a silicon dioxide nanoparticle modified using the organic silicon compound of Formula (1)

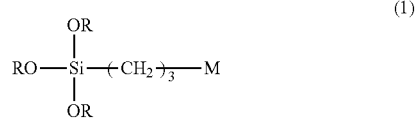

wherein R can be the same or different and is —H or —$C_2H_5$;

M is a substituent selected from the following:

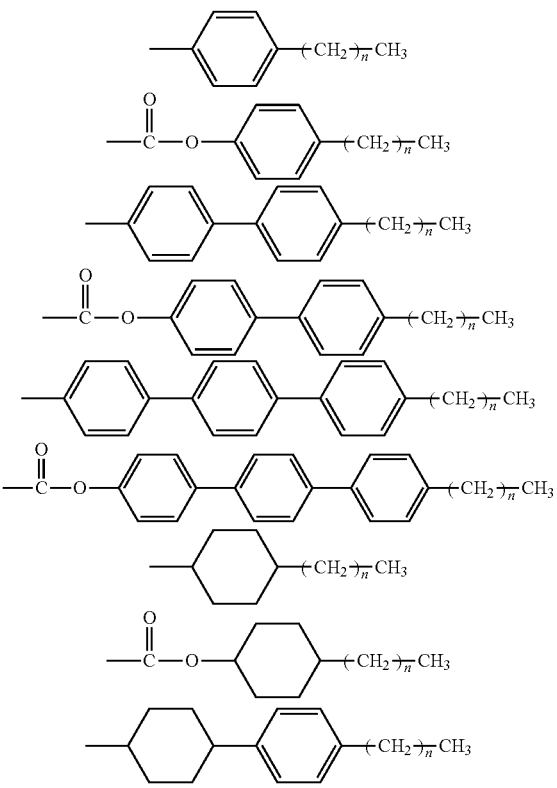

-continued

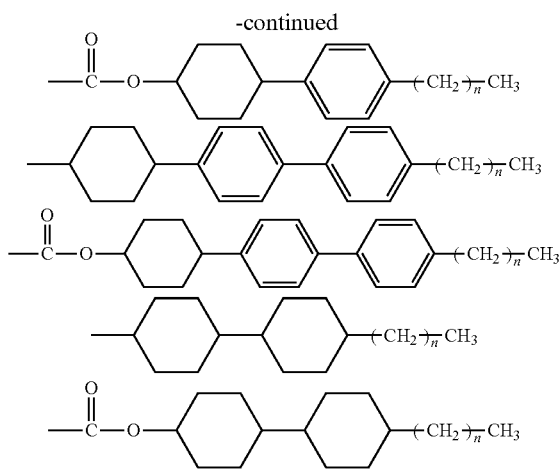

wherein n is an integer of 1-10.

Preferably, R is the same and is all —H or —C₂H₅. More preferably, R is all H.

Preferably, the particle size of the silicon dioxide nanoparticles is 100-200 nm.

Preferably, the aforementioned nanoparticle is used to induce the liquid crystal alignment.

Preferably, the process in particular comprises the following steps:
a) mixing the silicon dioxide nanoparticles with the organic silicon compound of Formula (1) and solvent and agitating, and removing the solvent after the completion of the reaction to obtain the modified silicon dioxide nanoparticles;
b) mixing the liquid crystals and the modified silicon dioxide nanoparticles to induce the alignment of the liquid crystals.

Preferably, in step a), after the silicon dioxide nanoparticles are mixed with the organic silicon compound of Formula (1) and the solvent, they are agitated at 60-80° C. for 24-100 h.

Preferably, in the mixture of step b), the liquid crystal accounts for 90-99% by weight fraction, and the modified silicon dioxide nanoparticles account for 1-10% by weight fraction.

The invention further provides a liquid crystal display panel, in which the aforementioned nanoparticles are used to induce the alignment of the liquid crystals.

The invention further provides a liquid crystal display device comprising the aforementioned liquid crystal display panel.

The invention further provides a use of the silicon dioxide nanoparticles modified with the organic silicon compound in a liquid crystal display panel, in particular for inducing the alignment of liquid crystals, for example, inducing the alignment of liquid crystals in the ADS mode.

Compared to the prior art, the process for using the silicon dioxide nanoparticles modified with the organic silicon compound to induce the alignment of liquid crystals according to the invention has the following advantages:
1. the organic silicon compound for modifying the silicon dioxide nanoparticles according to the invention has rigid groups such as benzene ring, biphenyl, and/or cyclohexane, which can effectively induce the alignment of liquid crystals, thereby improving the display effect of the ADS mode liquid crystal display panel;
2. the organic silicon compound for modifying the silicon dioxide nanoparticles according to the invention contains both rigid groups and flexible chains, and shares similar structures with the nematic liquid crystal molecules used in the ADS mode, making the modified silicon dioxide nanoparticles have good compatibility with the liquid crystals, facilitating the even dispersion of the modified silicon dioxide nanoparticles in liquid crystals, and thereby helping improve the display effect of the ADS mode liquid crystal display panel; and
3. after adding the modified silicon dioxide nanoparticles according to the invention in the liquid crystals, the driving voltage of the liquid crystal display panel can be lowered, so as to decrease the energy consumption.

BRIEF DESCRIPTION OF THE DRAWINGS

In order to more clearly illustrate the embodiments of the disclosure, the figures of the examples are briefly introduced below. It is obvious that the figures in the following description merely relates to a few examples of the disclosure but does not limit the disclosure.

FIG. 3 is the graph showing the mechanism of the ADS mode liquid crystal display panel, to which the mixture of the modified silicon dioxide nanoparticles according to the invention and the liquid crystals are added, before the power is turned on.

FIG. 4 is the graph showing the mechanism of the ADS mode liquid crystal display panel of FIG. 3 after the power is turned on.

REFERENCE OF THE IDENTIFIERS USED IN FIGURES

Figure 1:
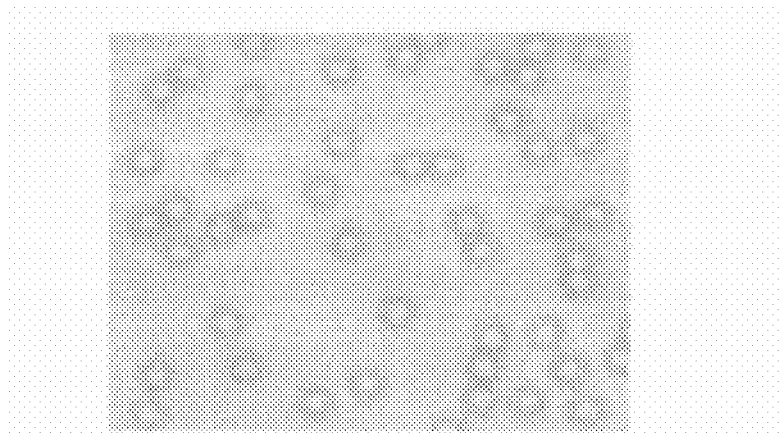
FIG. 1 is the microscopic image after the modified silicon dioxide nanoparticles according to the invention are mixed with the liquid crystals.

1 Color filter substrate
2 First horizontal alignment layer
3 Liquid crystal molecules
4 Modified silicon dioxide nanoparticles
5 Second horizontal alignment layer
6 Common (COM) electrode
7 Insulating layer
8 Pixel electrode
9 Array substrate
12 Organic compounds
13, 14 Arrows

DETAILED DESCRIPTION

In order to make the purpose, technical solutions and advantages of the disclosure more obvious, the technical solutions of the disclosure are described in a clear and complete manner in light of the figures of the disclosure. It is obvious that the examples described are merely a portion of examples of the disclosure, rather than all examples. All other examples obtained by a skilled artisan on the basis of the examples of the disclosure described without resorting to inventive work are within the scope of the disclosure.

The main sprits of the invention is to use an organic silicon compound sharing a similar structure with the nematic liquid crystal molecules in ADS mode to modify the silicon dioxide nanoparticles, so that the modified silicon dioxide nanoparticles are evenly dispersed in the liquid crystals; moreover, the organic silicon compound contains rigid groups such as benzene rings, biphenyl, and/or cyclohexane which can effectively induce the alignment of the liquid crystals, thereby improving the display effect of the ADS mode liquid crystal display panel.

The invention provides a nanoparticle inducing liquid crystal alignment in ADS mode, wherein the nanoparticle is a silicon dioxide nanoparticle modified using the organic silicon compound of Formula (1),

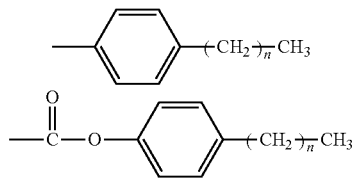

(1)

wherein R can be the same or different and is —H or —C$_2$H$_5$5; preferably, R is the same and is all H or —C$_2$H$_5$; more preferably, R is all H;

M is a substituent selected from the following:

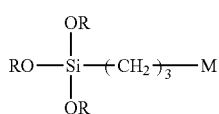

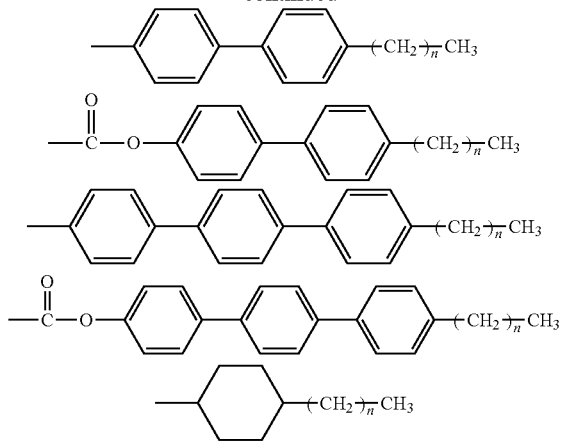

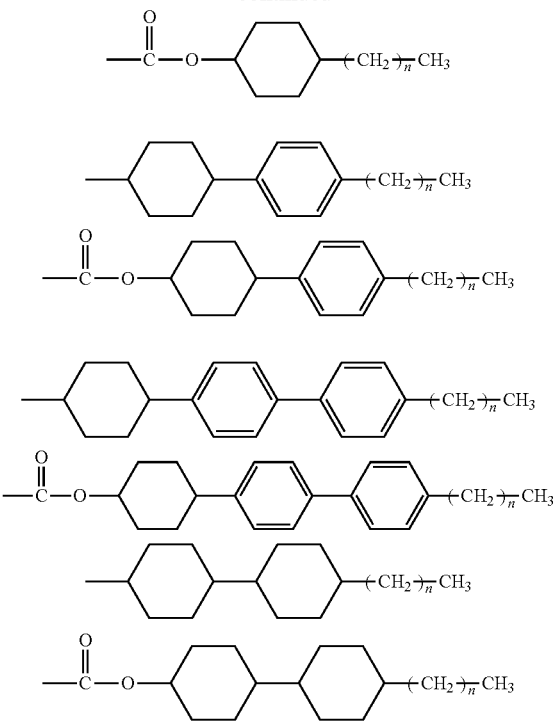

wherein n is an integer of 1-10. Preferably, R is the same and is all —H or —C$_2$H$_5$. More preferably, R is all H.

After mixing the silicon dioxide nanoparticles with the organic silicon compound of Formula (1), the hydroxyl on the surface of the silicon dioxide nanoparticles undergoes a reaction as shown in Formula (2) with the organic silicon compound of Formula (1), thereby modifying the silicon dioxide nanoparticles with the organic compound.

Formula (2)

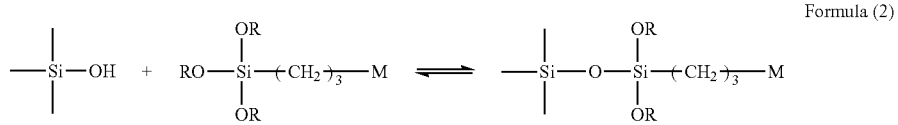

The organic silicon compound for modifying the silicon dioxide nanoparticles contains rigid groups such as benzenes, biphenyl and/or cyclohexane and a flexible chain (—(CH$_2$)$_n$—CH$_3$), whose terminals do not contain electron withdrawing groups. This structure is similar to that of the nematic liquid crystal molecules employed in ADS mode. According to the principle of "like dissolves like", the modified silicon dioxide nanoparticles according to the invention has good compatibility with the liquid crystals and the agglomeration of the silicon dioxide nanoparticles in the liquid crystals can be avoided, thereby facilitating the even dispersion of the silicon dioxide nanoparticles in the liquid crystals. FIG. 1 is the microscopic image after the modified silicon dioxide nanoparticles according to the invention are mixed with the liquid crystals (transmission electronic microscope (TEM), with a magnitude of 20000 times, FEI Co., NNL 2000). From the figure, it can be seen that the modified silicon dioxide nanoparticles are evenly distributed in the liquid crystals and no agglomeration occurs. Therefore, the silicon dioxide nanoparticles modified with the organic silicon compound as shown in Formula (1) can disperse evenly in the liquid crystals, helping improve the display effect of the ADS mode liquid crystal display panel.

Figure 2:
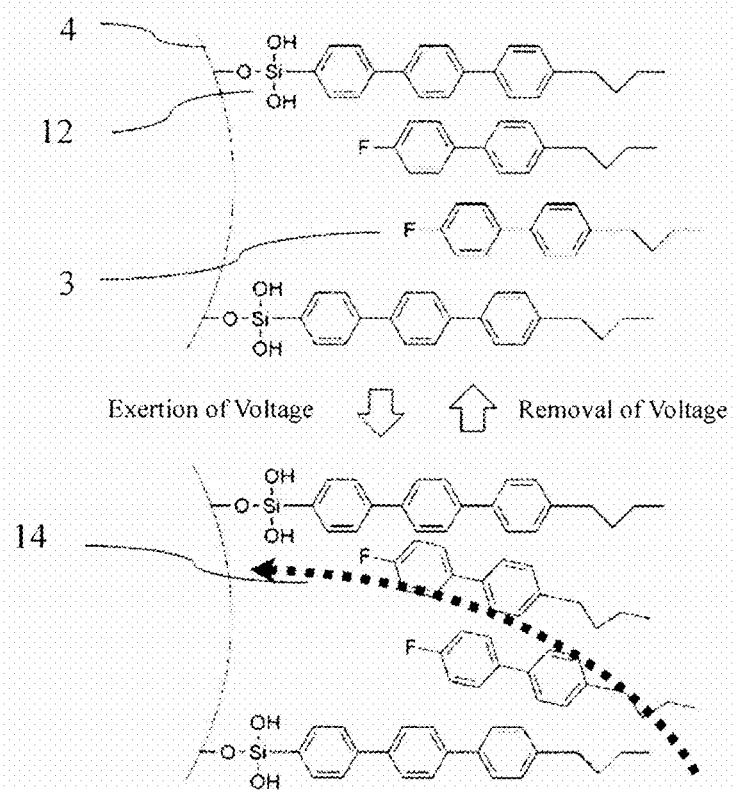
FIG. 2 is the graph showing the mechanism by which the modified silicon dioxide nanoparticles according to the invention induce the alignment of the liquid crystals.

The siloxane rod-like organic compounds on the modified silicon dioxide nanoparticles of the invention can induce the liquid crystals to arrange along their axes through the influence of intermolecular boundary effect, thereby effectively inducing the directional alignment of the liquid crystals and improving the display effect of the ADS mode liquid crystal display panel. FIG. 2 is the graph showing the mechanism by which the modified silicon dioxide nanoparticles according to the invention induce the alignment of the liquid crystals. From the figure it can be seen that before the exertion of the voltage, the alignment of the liquid crystal molecule 3 is the same as the long axis direction of the organic compound 12 on the surface of the modified silicon dioxide nanoparticles 4; and after the exertion of the voltage, the direction of the ADS mode electric field is as shown by the arrow 14; the long axes of the liquid crystal molecules 3 are turned to align with the electric field direction; after the removal of the voltage, since the organic compound 12 on the surface of the modified silicon dioxide nanoparticles contains rigid groups such as benzene rings, biphenyl and/or cyclohexane, the influence of the boundary effect of the organic compound 12 on the liquid crystal molecules 3 is more easily reverted to the original state, that is, align with the direction of the long axis of the organic compound 12, thereby enabling the induction of the regular alignment of the liquid crystal molecules 3.

Figure 3:
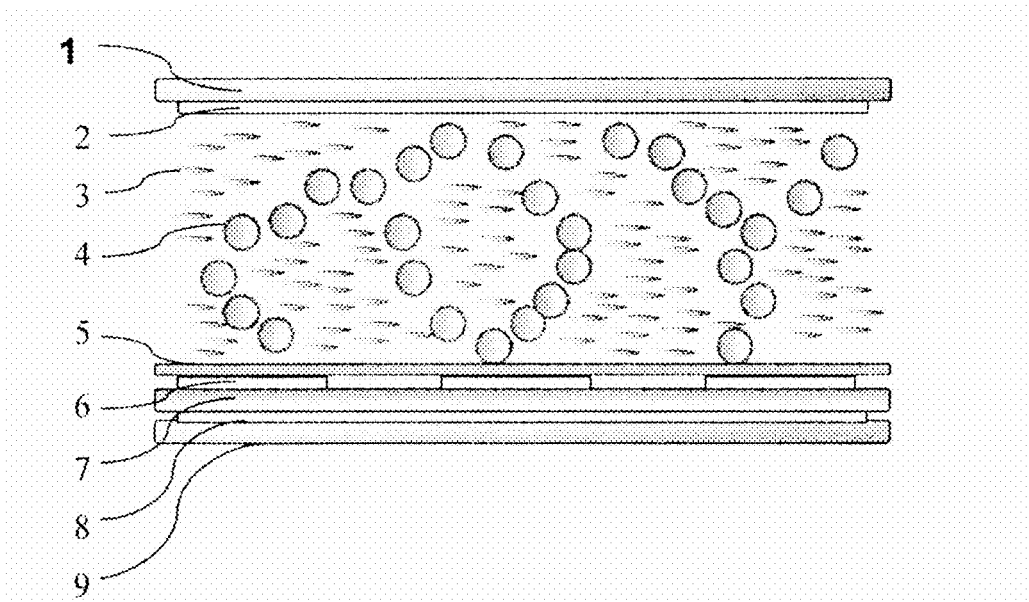

FIG. 3 is the graph showing the mechanism of the ADS mode liquid crystal display panel, to which the mixture of the modified silicon dioxide nanoparticles according to the invention and the liquid crystals are added, before the power is turned on. As shown in FIG. 3, a first horizontal alignment layer 2 is coated on a colored film substrate 1, a pixel electrode 8, an insulating layer 7, a common (COM) electrode 6 and a second horizontal alignment layer 5 are disposed from bottom to top on an array substrate 9, and modified silicon dioxide nanoparticles and liquid crystal molecules 3 are filled between the first horizontal alignment layer 2 of the colored film substrate 1 and the second horizontal alignment layer 5 of the array substrate 9. When the interior of the liquid crystal display panel is horizontally aligned, the long axes of the liquid crystal molecules 3 align with the substrate, and the modified silicon dioxide nanoparticles 4 are evenly dispersed in the liquid crystal molecules 3.

Figure 4:
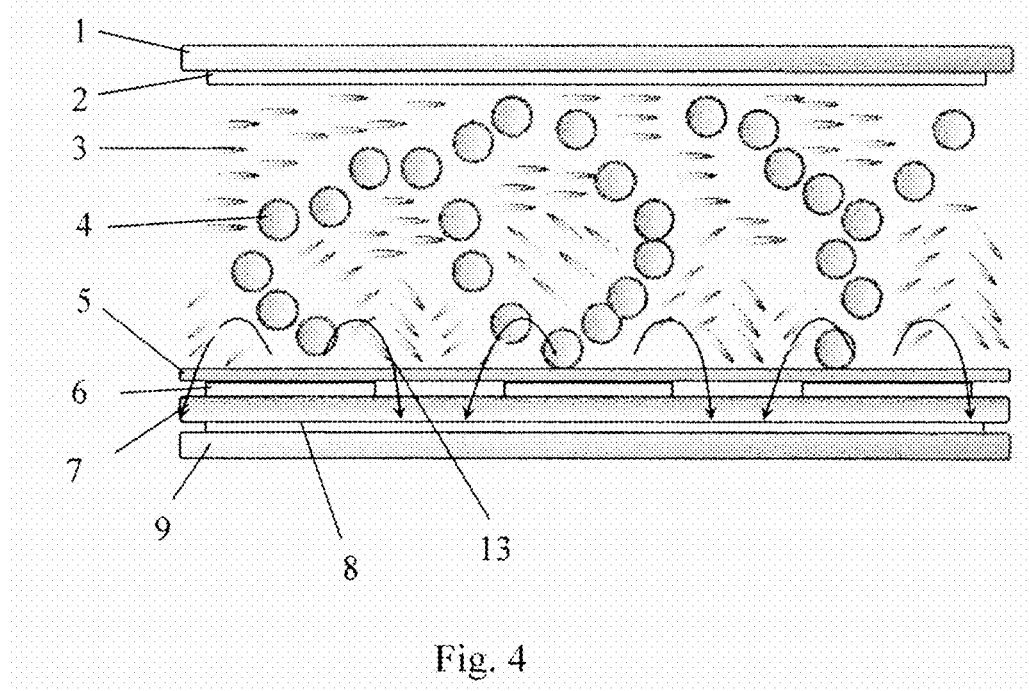

FIG. 4 is the graph showing the mechanism of the ADS mode liquid crystal display panel of FIG. 3 after the power is turned on. From the figure, it can be seen that after the power is turned on, the liquid crystals 3 will align with the electric field direction (the direction as shown by the arrow 13). The organic compound 12 on the surface of the modified silicon dioxide nanoparticles 4 does not contain electron withdrawing group at terminals, so it will not have spatial movement itself under the electric field. After the power is turned off, the liquid crystal molecules 3 will revert to the state in which the axis of the liquid crystal align with the substrate. Now the rod-like organic compound on the modified silicon dioxide nanoparticles will induce the surrounding liquid crystal molecules to align with the array substrate 9 and the colored film substrate 1. As such, the direction of the alignment of the liquid crystal molecules can be effectively controlled by modified silicon dioxide nanoparticles.

When the organic silicon compound for modifying the silicon dioxide nanoparticles according to the invention contains different amount of benzene rings, biphenyl, cyclohexane and the like, they have different induction and alignment effect on nematic liquid crystals. When the organic silicon compound has fewer rigid groups such as benzene rings, biphenyl, cyclohexane and the like, the molecule has a poor rigidity and has a small inductive effect on the liquid crystals. When the organic silicon compound has fewer rigid groups such as benzene rings, biphenyl, cyclohexane and the like, the molecule has a strong rigidity and a large inductive effect on the liquid crystals.

The length of the flexible chain in the organic silicon compound for modifying the silicon dioxide nanoparticles according to the invention will affect the dispersion of the silicon dioxide nanoparticles in the liquid crystals. When the flexible chain becomes longer, the dispersion of the silicon dioxide nanoparticles modified by the organic silicon compound in the liquid crystals will be better; and when the flexible chain becomes shorter, the dispersion of the silicon dioxide nanoparticles modified by the organic silicon compound in the liquid crystals will be poorer.

The particle size of the silicon dioxide nanoparticles according to the invention is 100-200 nm. The particle size of the silicon dioxide nanoparticles will also affect the dispersion of the silicon dioxide nanoparticles in the liquid crystals. When the silicon dioxide nanoparticles becomes larger, it has more surface hydroxyls and more groups to react with the organic silicon compound, it will has a better dispersion effect in the liquid crystals. However, when the particle size of the silicon dioxide nanoparticles is too large, it will not be so easily compatible with the liquid crystal molecules because the inorganic compound is too large. If the particle size of the silicon dioxide nanoparticles is too small, it has less surface hydroxyls and less groups to react with the organic silicon compound, it will have fewer siloxane rod-like organic compounds on the surface of the modified silicon dioxide nanoparticles, thereby decreasing the ability to induce the directional alignment of the liquid crystals.

The invention further provides a process for inducing liquid crystal alignment in ADS mode by inducing the liquid crystal alignment with the aforementioned nanoparticles inducing the liquid crystal alignment in ADS mode.

Figure 5:
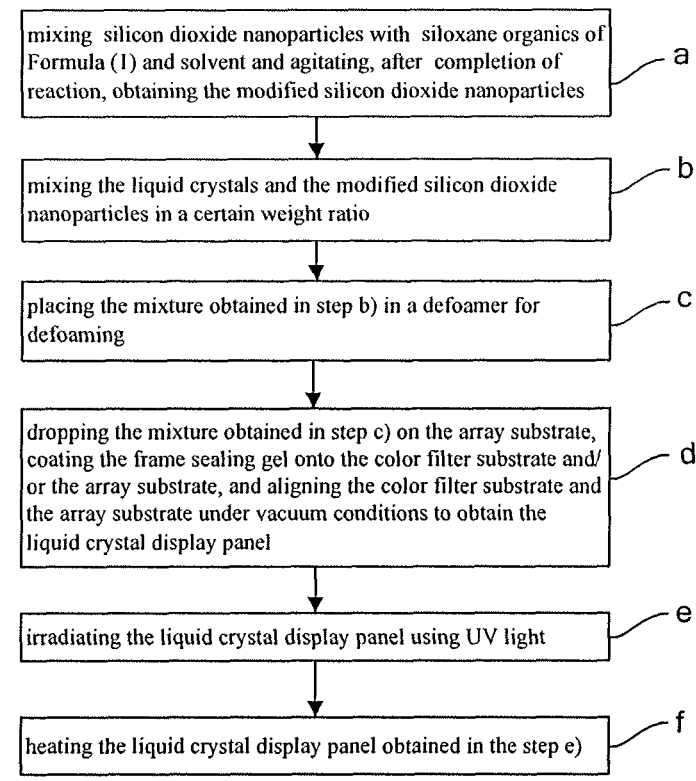
FIG. 5 shows the steps of the process for inducing the alignment of liquid crystals using the nanoparticles according to the invention.

The aforementioned process for inducing liquid crystal alignment in ADS mode in particular can further comprise the steps of (as shown in FIG. 5):
  a) mixing the silicon dioxide nanoparticles with the organic silicon compound of Formula (1) and solvent and agitating, and removing the solvent after the completion of the reaction to obtain the modified silicon dioxide nanoparticles;
  b) mixing the liquid crystals and the modified silicon dioxide nanoparticles in a certain weight ratio to induce the alignment of the liquid crystals.

The invention further provides a liquid crystal display panel, in which the aforementioned nanoparticles are used to induce the alignment of the liquid crystals.

Furthermore, to manufacture the liquid crystal panel, the following steps are included (as shown in FIG. 5):
  c) placing the mixture obtained in step b) in a defoamer for defoaming.
  d) dropping the mixture obtained in step c) on the array substrate, coating the frame sealing gel onto the color filter substrate and/or the array substrate, and aligning the color filter substrate and the array substrate under vacuum conditions to obtain the liquid crystal display panel;
  e) irradiating the liquid crystal display panel using UV light; and f) heating the liquid crystal display panel obtained in the step e).

In particular, in the aforementioned step a), the silicon dioxide nanoparticles are mixed with the organic silicon compound of Formula (1) and the solvent and agitated at 60-80° C. for 24-100 h. After the completion of the reaction, the mixed solvent is evaporated with a vacuum rotatory evaporator, the solid obtained is washed with ethanol, the unreacted organic silicon compounds are removed, and the washed solids are baked to dryness, thus obtaining the modified silicon dioxide nanoparticles. The solvent used in this step can be a conventional organic solvent in the art.

The solvent in the invention is preferably a mixed solvent of acetone, tetrahydrofuran, ethanol and water, more preferably a mixed solvent of acetone, tetrahydrofuran, ethanol and water with a volume ratio of 2:1:2:1.

In the aforementioned step b), it is preferred that the weight fraction of the liquid crystal is 90-99%, and the weight fraction of the modified silicon dioxide is 1-10%.

In the aforementioned step c), it is preferred that the duration for the defoaming treatment is 1-10 hours.

Before step d), a horizontal alignment layer needs to be coated on the colored film substrate and the array substrate, the alignment is undergone by rubbing with flannelette, and then the mixture obtained in step c) is dropped onto the array substrate for vacuum alignment.

In the aforementioned step e), the liquid crystal display panel can be irradiated using the conventional conditions, preferably the UV light wavelength is 350-380 mm, the duration of the UV irradiation is 1-60 min, and the intensity of the UV irradiation is 0.1-100 m W/cm$^2$.

In the aforementioned step f), the liquid crystal display panel can be heated using the conventional conditions, preferably heating at 90-150° C. for 1-3 h.

The invention further provides a liquid crystal display device comprising the aforementioned liquid crystal display panel containing the aforementioned nanoparticles inducing the alignment of liquid crystals in ADS mode.

The invention further provides use of the silicon dioxide nanoparticles modified with the organic silicon compound of Formula (1) in a liquid crystal panel, in particular for inducing the alignment of liquid crystals, for example, inducing the alignment of liquid crystals in the ADS mode.

Below are specific embodiments for preparing liquid crystal display panels using the process for inducing the alignment of liquid crystals in ADS mode according to the invention.

A. Preparation of the Liquid Crystal Display Panel

Example 1 a) 1 g of silicon dioxide particles with particle size at the range of 100-200 nm and 3 g of the organic silicon compound of Formula (1) (for the organic silicon compound of Formula (1) used in Example 1, see Table 1; purchased from ALDRICH) are dissolved into 30 ml mixed solvent consisting of 10 ml acetone, 5 ml tetrahydrofuran, 10 ml water and 5 ml ethanol, the silicon dioxide nanoparticles, the organic silicon compound and the solvent are mixed and agitated at 70° C. for 48 h; after the completion of the reaction, the mixed solvent is evaporated with a vacuum rotatory evaporator, the solid obtained is washed with ethanol, the unreacted organic silicon compounds are removed, and the washed solids are baked to dryness, thus obtaining the modified silicon dioxide nanoparticles.

b) The liquid crystals and the modified silicon dioxide nanoparticles are mixed in a certain weight ratio, wherein the weight fraction of the liquid crystals is 99% and the weight fraction of the modified silicon dioxide nanoparticles is 1%.

c) The mixture obtained in step b) is placed in the defoamer for one hour of defoaming.

d) The horizontal alignment layers are coated onto the colored film substrate and the array substrate, respectively; alignment is undergone by rubbing with flannelette, then the mixture obtained in step c) is dropped on the array substrate; frame sealing gel is coated onto the colored film substrate, and the colored filter substrate and the array substrate are aligned under vacuum conditions to obtain the liquid crystal display panel.

e) The liquid crystal display panel is irradiated using UV light, wherein the UV light wavelength is 350 mm, the duration of the UV irradiation is 1 min, and the intensity of the UV irradiation is 100 mW/cm$^2$.

f) The liquid crystal display panel obtained in the step e) is heated at 135° C. for 1.5 h to obtain the liquid crystal display panel 1.

Example 2 a) 1.5 g of silicon dioxide particles with particle size at the range of 100-200 nm and 4 g of the organic silicon compound of Formula (1) (for the organic silicon compound of Formula (1) used in Example 2, see Table 1; purchased from ALDRICH) are dissolved into 60 ml mixed solvent consisting of 20 ml acetone, 10 ml tetrahydrofuran, 20 ml water and 10 ml ethanol, the silicon dioxide nanoparticles, the organic silicon compound and the solvent are mixed and agitated at 60° C. for 100 h; after the completion of the reaction, the mixed solvent is evaporated with a vacuum rotatory evaporator, the solid obtained is washed with ethanol, the unreacted organic silicon compounds are removed, and the washed solids are baked to dryness, thus obtaining the modified silicon dioxide nanoparticles.

b) The liquid crystals and the modified silicon dioxide nanoparticles are mixed in a certain weight ratio, wherein the weight fraction of the liquid crystals is 97% and the weight fraction of the modified silicon dioxide nanoparticles is 3%.

c) The mixture obtained in step b) is placed in the defoamer for three hours of defoaming.

d) The horizontal alignment layers are coated onto the colored film substrate and the array substrate, respectively; alignment is undergone by rubbing with flannelette, then the mixture obtained in step c) is dropped on the array substrate; frame sealing gel is coated onto the colored film substrate, and the colored filter substrate and the array substrate are aligned under vacuum conditions to obtain the liquid crystal display panel.

e) The liquid crystal display panel is irradiated using UV light, wherein the UV light wavelength is 365 mm, the duration of the UV irradiation is 10 min, and the intensity of the UV irradiation is 80 mW/cm$^2$.

f) The liquid crystal display panel obtained in the step e) is heated at 100° C. for 2.5 h to obtain the liquid crystal display panel 2.

Example 3 a) 2 g of silicon dioxide particles with particle size at the range of 100-200 nm and 3.5 g of the organic silicon compound of Formula (1) (for the organic silicon compound of Formula (1) used in Example 3, see Table 1; purchased from ALDRICH) are dissolved into 30 ml mixed solvent consisting of 10 ml acetone, 5 ml tetrahydrofuran, 10 ml water and 5 ml ethanol, the silicon dioxide nanoparticles, the organic silicon compound and the solvent are mixed and agitated at 80° C. for 24 h; after the completion of the reaction, the mixed solvent is evaporated with a vacuum rotatory evaporator, the solid obtained is washed with ethanol, the unreacted organic silicon compounds are removed, and the washed solids are baked to dryness, thus obtaining the modified silicon dioxide nanoparticles.

b) The liquid crystals and the modified silicon dioxide nanoparticles are mixed in a certain weight ratio, wherein the weight fraction of the liquid crystals is 95% and the weight fraction of the modified silicon dioxide nanoparticles is 5%.

c) The mixture obtained in step b) is placed in the defoamer for 6 hours of defoaming.

d) The horizontal alignment layers are coated onto the colored film substrate and the array substrate, respectively; alignment is undergone by rubbing with flannelette, then the mixture obtained in step c) is dropped on the array substrate; frame sealing gel is coated onto the colored film substrate, and the colored filter substrate and the array substrate are aligned under vacuum conditions to obtain the liquid crystal display panel.

e) The liquid crystal display panel is irradiated using UV light, wherein the UV light wavelength is 370 mm, the duration of the UV irradiation is 25 min, and the intensity of the UV irradiation is 55 mW/cm$^2$.

f) The liquid crystal display panel obtained in the step e) is heated at 120° C. for 2 h to obtain the liquid crystal display panel 3.

Example 4 a) 2.5 g of silicon dioxide particles with particle size at the range of 100-200 nm and 4.5 g of the organic silicon compound of Formula (1) (for the organic silicon compound of Formula (1) used in Example 4, see Table 1; purchased from ALDRICH) are dissolved into 90 ml mixed solvent consisting of 30 ml acetone, 15 ml tetrahydrofuran, 30 ml water and 15 ml ethanol, the silicon dioxide nanoparticles, the organic silicon compound and the solvent are mixed and agitated at 75° C. for 35 h; after the completion of the reaction, the mixed solvent is evaporated with a vacuum rotatory evaporator, the solid obtained is washed with ethanol, the unreacted organic silicon compounds are removed, and the washed solids are baked to dryness, thus obtaining the modified silicon dioxide nanoparticles.

b) The liquid crystals and the modified silicon dioxide nanoparticles are mixed in a certain weight ratio, wherein the weight fraction of the liquid crystals is 95% and the weight fraction of the modified silicon dioxide nanoparticles is 5%.

c) The mixture obtained in step b) is placed in the defoamer for 8 hours of defoaming.

d) The horizontal alignment layers are coated onto the colored film substrate and the array substrate, respectively; alignment is undergone by rubbing with flannelette, then the mixture obtained in step c) is dropped on the array substrate; frame sealing gel is coated onto the colored film substrate, and the colored filter substrate and the array substrate are aligned under vacuum conditions to obtain the liquid crystal display panel.

e) The liquid crystal display panel is irradiated using UV light, wherein the UV light wavelength is 360 mm, the duration of the UV irradiation is 40 min, and the intensity of the UV irradiation is 20 mW/cm$^2$.

f) The liquid crystal display panel obtained in the step e) is heated at 90° C. for 3 h to obtain the liquid crystal display panel 4.

Example 5 a) 3 g of silicon dioxide particles with particle size at the range of 100-200 nm and 5 g of the organic silicon compound of Formula (1) (for the organic silicon compound of Formula (1) used in Example 5, see Table 1; purchased from ALDRICH) are dissolved into 60 ml mixed solvent consisting of 20 ml acetone, 10 ml tetrahydrofuran, 20 ml water and 10 ml ethanol, the silicon dioxide nanoparticles, the organic silicon compound and the solvent are mixed and agitated at 60° C. for 80 h; after the completion of the reaction, the mixed solvent is evaporated with a vacuum rotatory evaporator, the solid obtained is washed with ethanol, the unreacted organic silicon compounds are removed, and the washed solids are baked to dryness, thus obtaining the modified silicon dioxide nanoparticles.

b) The liquid crystals and the modified silicon dioxide nanoparticles are mixed in a certain weight ratio, wherein the weight fraction of the liquid crystals is 90% and the weight fraction of the modified silicon dioxide nanoparticles is 10%.

c) The mixture obtained in step b) is placed in the defoamer for 10 hours of defoaming.

d) The horizontal alignment layers are coated onto the colored film substrate and the array substrate, respectively; alignment is undergone by rubbing with flannelette, then the mixture obtained in step c) is dropped on the array substrate; frame sealing gel is coated onto the colored film substrate, and the colored filter substrate and the array substrate are aligned under vacuum conditions to obtain the liquid crystal display panel.

e) The liquid crystal display panel is irradiated using UV light, wherein the UV light wavelength is 380 mm, the duration of the UV irradiation is 60 min, and the intensity of the UV irradiation is 0.1 mW/cm$^2$.

f) The liquid crystal display panel obtained in the step e) is heated at 150° C. for 1 h to obtain the liquid crystal display panel 5.

TABLE 1 the structure formula of the organic silicon compounds in Examples 1-5

| | | Formula of Organic Silicon Compound |
| --- | --- | --- |
| Example | R in organic silicon compound | Chemical formula for M in the organic silicon compound |
| Example 1 | H | 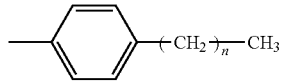 n = 1 |

TABLE 1-continued the structure formula of the organic silicon compounds in Examples 1-5

Formula of Organic Silicon Compound

| Example | R in organic silicon compound | Chemical formula for M in the organic silicon compound |
|---|---|---|
| Example 2 | —$C_2H_5$ | ![structure] —C(=O)—O—C6H4—C6H4—(CH2)$_n$—CH3, n = 3 |
| Example 3 | —$C_2H_5$ | —cyclohexyl—(CH2)$_n$—CH3, n = 5 |
| Example 4 | H | —C(=O)—O—cyclohexyl—C6H4—(CH2)$_n$—CH3, n = 10 |
| Example 5 | —$C_2H_5$ | —cyclohexyl—cyclohexyl—(CH2)$_n$—CH3, n = 7 |

II. Testing of the Liquid Crystal Display Panels

The liquid crystals are alone filled into the liquid crystal boxes (see steps c-f in specific examples) to obtain the liquid crystal display panel 0. Voltage is applied to the liquid crystal display panel 0 and the liquid crystal display panel 2 obtained in Example 2, and the voltage-temperature (V-T) plot is tested using a liquid crystal integrated test device (LCT-5016C, Changchun Liancheng Device Co. Ltd., He—Ne light source, wave length: 632.8 mm, voltage: 220V).

Figure 6:
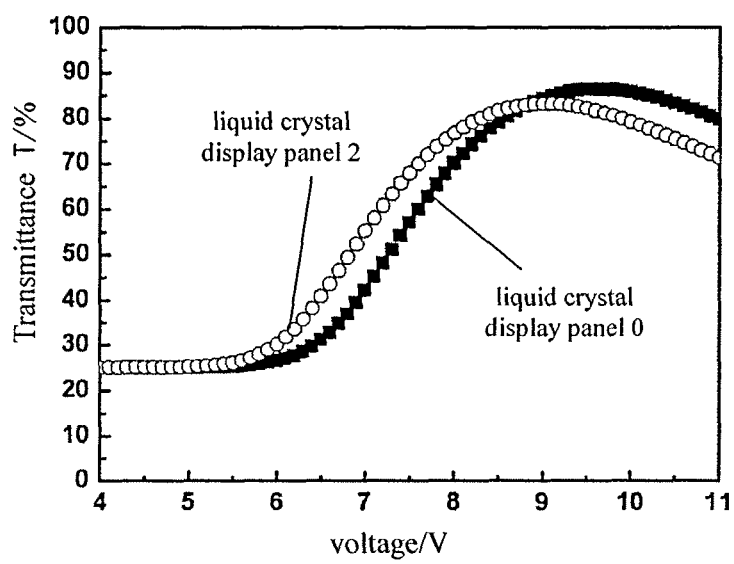
FIG. 6 is the V-T plot before and after the addition of the modified silicon dioxide nanoparticles according to the invention to the ADS mode liquid crystal display panel.

The structural formulae of the organic silicon compounds for modifying the silicon dioxide nanoparticles in Examples 1-5 are listed in Table 1. FIG. 6 is the V-T plot of the liquid crystal display panel without (the liquid crystal display panel 0) and with (the liquid crystal display panel 2) the addition of the modified silicon dioxide nanoparticles according to the invention. From the figure it can be seen, before the addition of the modified silicon dioxide nanoparticles according to the invention, the maximal driving voltage of the liquid crystal display panel is 9.72 V, and after the addition of the modified silicon dioxide nanoparticles according to the invention, the maximal driving voltage of the liquid crystal display panel drops to 8.85 V. Therefore, the addition of modified silicon dioxide nanoparticles to the liquid crystals helps decrease the driving voltage of the liquid crystal panel, thereby decreasing the energy consumption.

In sum, in the invention, the organic silicon compounds, which share similar structures with the nematic liquid crystal molecules in the ADS mode, are employed for modifying the silicon dioxide nanoparticles, facilitating the even dispersion of the modified silicon dioxide nanoparticles in liquid crystals; and the organic silicon compound contains rigid groups such as benzene rings, biphenyl and/or cyclohexane etc. that can effectively induce the directional alignment of the liquid crystals, thereby helping improve the display effect of the ADS mode liquid crystal display panel; moreover, the addition of silicon dioxide nanoparticles in the liquid crystals helps reducing the driving voltage of the liquid crystal display so as to decrease the energy consumption.

The aforementioned are merely exemplary embodiments of the disclosure and are not limiting the scope of the disclosure, which is determined by the appended claims.

The invention claimed is:

1. A liquid crystal display panel, wherein the alignment of the liquid crystals is induced using a nanoparticle which is a silicon dioxide nanoparticle modified using an organic silicon compound of Formula (1),

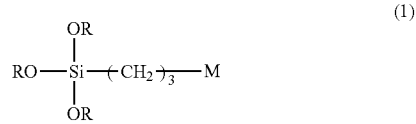

(1)

wherein R can be the same or different and is —H or —$C_2H_5$;
M is a substituent selected from the following:

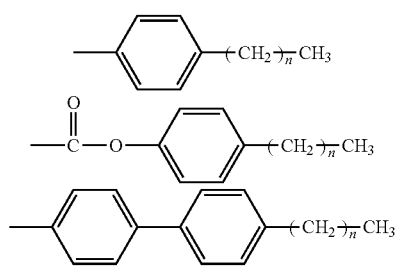

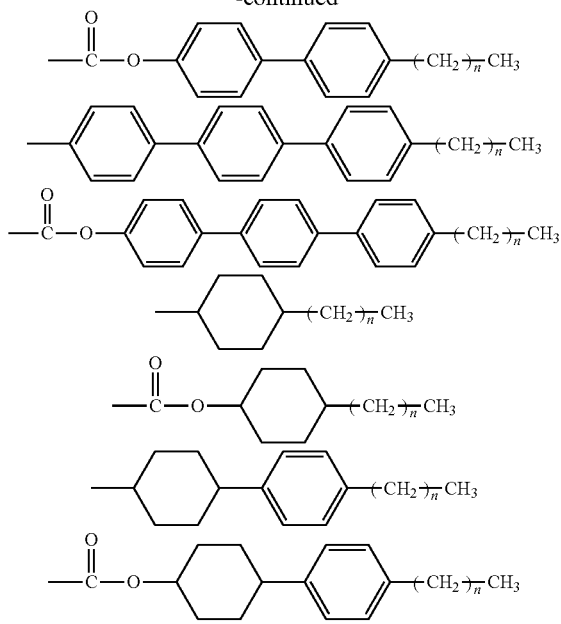
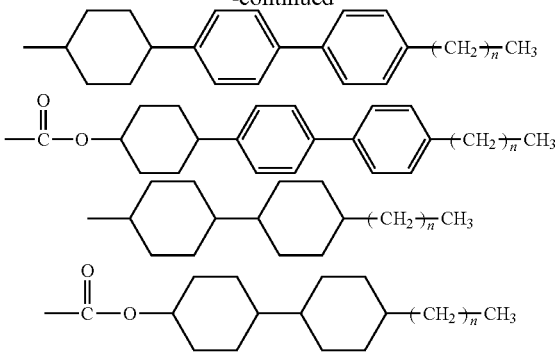
wherein n is an integer of 1-10.
2. A liquid crystal display panel according to claim 1, wherein the particle size of the silicon dioxide nanoparticles used is in the range of 100-200 nm.
3. A liquid crystal display device comprising the liquid crystal display panel according to claim 1.
4. A liquid crystal display device comprising the liquid crystal display panel according to claim 2.
* * * * *